(12) United States Patent
Hasiao et al.

(10) Patent No.: US 9,429,687 B2
(45) Date of Patent: Aug. 30, 2016

(54) IMAGE-CAPTURING ASSEMBLY AND ARRAY LENS UNITS THEREOF

(71) Applicant: HIMAX TECHNOLOGIES LIMITED, Tainan (TW)

(72) Inventors: Yun-Lien Hasiao, Tainan (TW); Shu-Hao Hsu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 14/246,382

(22) Filed: Apr. 7, 2014

(65) Prior Publication Data

US 2015/0062714 A1    Mar. 5, 2015

Related U.S. Application Data

(60) Provisional application No. 61/870,883, filed on Aug. 28, 2013.

(51) Int. Cl.
| | |
|---|---|
| G02B 27/10 | (2006.01) |
| G03B 21/56 | (2006.01) |
| G03B 21/60 | (2014.01) |
| G02B 3/00 | (2006.01) |
| G02B 13/00 | (2006.01) |

(52) U.S. Cl.
CPC ......... *G02B 3/0075* (2013.01); *G02B 13/0085* (2013.01)

(58) Field of Classification Search
CPC .. G02B 27/145; G02B 3/0056; G02B 5/045; G03B 21/56; G03B 21/625; G03B 21/602
USPC ........ 359/618–621, 625–626, 443, 454–455; 264/1.1, 1.32, 2.7
See application file for complete search history.

(56) References Cited

U.S. PATENT DOCUMENTS

| | | | | |
|---|---|---|---|---|
| 5,973,844 | A | * | 10/1999 | Burger ........................ 359/622 |
| 2005/0237610 | A1 | * | 10/2005 | Sekiguchi ............ G03B 21/625 359/457 |
| 2009/0290221 | A1 | * | 11/2009 | Hansen et al. ................ 359/619 |
| 2010/0177400 | A1 | * | 7/2010 | Yamamura ............... B41J 2/451 359/619 |

* cited by examiner

*Primary Examiner* — Dawayne A Pinkney

(74) *Attorney, Agent, or Firm* — McClure, Qualey & Rodack, LLP

(57) ABSTRACT

A lens module is disclosed. The lens module includes a substrate assembly and an array of lens units. The substrate assembly includes a main body and a supporting layer formed on the substrate assembly. The main body has a front surface, a rear surface opposite to the front surface, and at least one lateral surface connecting the front surface to the rear surface. The supporting layer has a planar configuration and is formed on the main body. The main body is made of a first material and the supporting layer is made of a second material different from the first material.

20 Claims, 7 Drawing Sheets

IMAGE-CAPTURING ASSEMBLY AND ARRAY LENS UNITS THEREOF

CROSS REFERENCE TO RELATED APPLICATIONS

This application claims the benefit of priority from U.S. Provisional Application Ser. No. 61/870,883, filed Aug. 28, 2013, teachings of which are herein incorporated by reference in their entirety.

BACKGROUND OF THE INVENTION

1. Field of the Invention

The invention relates to an electrical device with an optical element, and in particular to an image-capturing assembly with a lens module.

2. Description of the Related Art

Miniaturized cameras are widely used in many electronic products, such as mobile phones and personal computers. Mobile phones and personal computers employing image-capturing devices have become popular due to employment of solid-state image-capture elements such as CCD (a charged coupled device)-type image sensors, CMOS (a complementary metal oxide semiconductor)-type image sensors, and the like, allowing for higher performance and miniaturization of image-capturing devices.

As advances in semiconductor manufacturing technology will never stop while electronic products are becoming even more compact at the same time, the pixel size of sensors will only become even smaller and the standard for image quality grows even higher. A conventional lens module, therefore, is not applicable for higher-end lens modules.

BRIEF SUMMARY OF THE INVENTION

The disclosure is directed to a lens module capable of providing good imaging quality and miniaturization.

According to some embodiments of the disclosure, the lens module includes a substrate assembly and an array of lens units formed on the substrate assembly. The substrate assembly includes a main body and a supporting layer. The main body has a front surface, a rear surface opposite to the front surface, and at least one lateral surface connecting the front surface to the rear surface. The supporting layer has a planar configuration and is formed on the main body. The main body is made of a first material and the supporting layer is made of a second material different from the first material.

In the aforementioned embodiments, the array of lens units are arranged on a predetermined plane, and the supporting layer extends in an extension direction parallel to the predetermined plane.

In the aforementioned embodiments, the supporting layer is formed on at least one of the front surface and the rear surface. An edge of the supporting layer is distant from the lateral surface.

In the aforementioned embodiments, the number of lateral surfaces is more than one. The supporting layer includes a plurality of supporting portions respectively connected to one of the lateral surfaces. One of the supporting portions has a stiffness that is different from the stiffness of the other supporting portion.

In the aforementioned embodiments, the number of supporting layers is more than one, and the supporting layers are stacked on the main body, wherein a stiffness of one of the supporting layers is different from a stiffness of another adjacent supporting layer.

In the aforementioned embodiments, an opening corresponding to a center of the main body is formed on the supporting layer.

In the aforementioned embodiments, the first material includes glass, and the second material includes polymer composites.

According to some other embodiments of the disclosure, the lens module includes a substrate assembly and an array of lens units formed on the substrate assembly. The substrate assembly includes a main body and a supporting layer. The main body has a central segment relative to an optical axis of the lens module and a peripheral segment located between the central segment and a lateral surface of the main body. The supporting layer, with a planar configuration, is formed on the main body and corresponds to the central segment, the peripheral segment, or both the central segment and peripheral segment. The main body includes a first material and the supporting layer includes a second material different from the first material.

In the aforementioned embodiments, the array of lens units are arranged on a predetermined plane, and the supporting layer extends in an extension direction parallel to the predetermined plane.

In the aforementioned embodiments, the supporting layer includes a plurality of supporting portions formed on the peripheral segment and arranged around the optical axis. One of the supporting portions has a stiffness that is different from the stiffness of the other supporting portion.

In the aforementioned embodiments, the supporting layer includes a first supporting portion and a second supporting portion formed on the peripheral segment and located at two opposite sides of the optical axis.

In the aforementioned embodiments, the number of supporting layers is more than one, and the supporting layers are stacked on the main body, wherein a stiffness of one of the supporting layers is different from a stiffness of another adjacent supporting layer.

In the aforementioned embodiments, the first material includes glass, and the second material includes polymer composites.

Another objective of the disclosure is to provide an image-capturing assembly including a lens module and an image-capture element. The image-capture element is configured to receive light passing through the array of lens units. In some embodiments, an opening is formed on the supporting layer, and the opening has a shape corresponding to a shape of the image-capture element.

With the arrangement of the supporting layer, the mechanical strength of the substrate assembly is increased. Therefore warpage of the substrate assembly is prevented, and the image quality of the image-capturing assembly using the lens module is improved.

BRIEF DESCRIPTION OF THE DRAWINGS

The invention can be more fully understood by reading the subsequent detailed description and examples with references made to the accompanying drawings.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
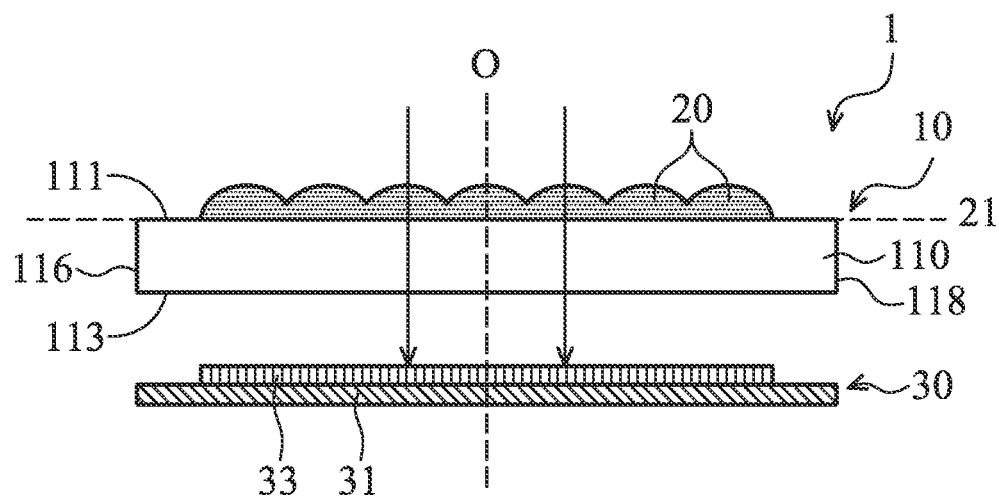
FIG. 1 shows an exploded view of an image-capturing assembly, in accordance with some embodiments.

Referring to FIG. 1, an exploded view of an image-capturing assembly 1 is shown, in accordance with some embodiments. The image-capturing assembly 1 includes a substrate assembly 10, an array of lens units 20, and an optical sensor unit 30 arranged along an optical axis O. Additional features can be added to the image-capturing assembly, and some of the features described below can be replaced or eliminated in other embodiments of the image-capturing assembly.

In some embodiments, the substrate assembly 10 includes a main body 110. In some embodiments, the main body 110 has a rectangular shape and is made of transparent glass. The main body 110 has a front surface 111 and a rear surface 113 opposite to the front surface 111. The front surface 111 and the rear surface 113 are connected by multiple lateral surfaces (such as the lateral surface 116 and 118).

The lens units 20 are arranged on the front surface 111 of the main body 110. In some embodiments, the lens units 20 are arranged along a predetermined plane 21 that is located on the front surface 111 of the main body 110. The lens units 20 may be wafer-level lenses and formed by molding, but the invention should not be limited thereto.

The optical sensor unit 30 includes a substrate 31 and an image-capture element 33. The image-capture element 33 is aligned with the optical axis O and is disposed on the substrate 31. The image-capture element 33, for example, is a complementary metal oxide semiconductor (CMOS) sensor.

To capture an image from outside of the image-capturing assembly 1, light is allowed to pass through the array of lens units 20 and the substrate assembly 10 and is received by the optical sensor unit 30 to produce image information.

Figure 2:
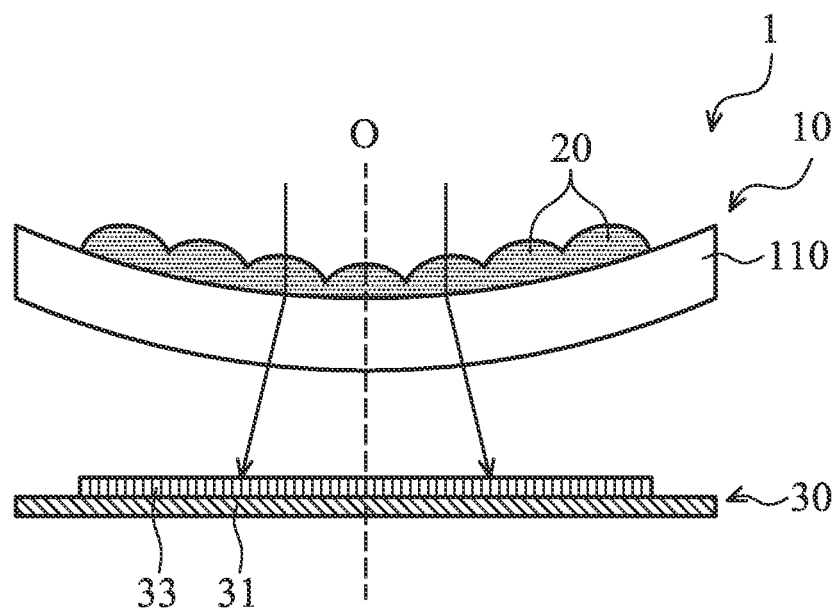
FIG. 2 shows an exploded view of the image-capturing assembly when warpage of a supporting assembly occurs, in accordance with some embodiments.

In some embodiments, due to material shrinkage, slim thickness of the main body 110, or stress applied on the main body 110 as the lens units 20 are formed thereon, warpage of the main body 110 occurs. As a result, as shown in FIG. 2, light passing through the array of lens units 20 and the substrate assembly 10 is deflected, and the image quality and the function of the image-capturing assembly 1 are adversely affected.

To solve the problem mentioned in the embodiments set forth, some other embodiments are further provided.

Figure 3:
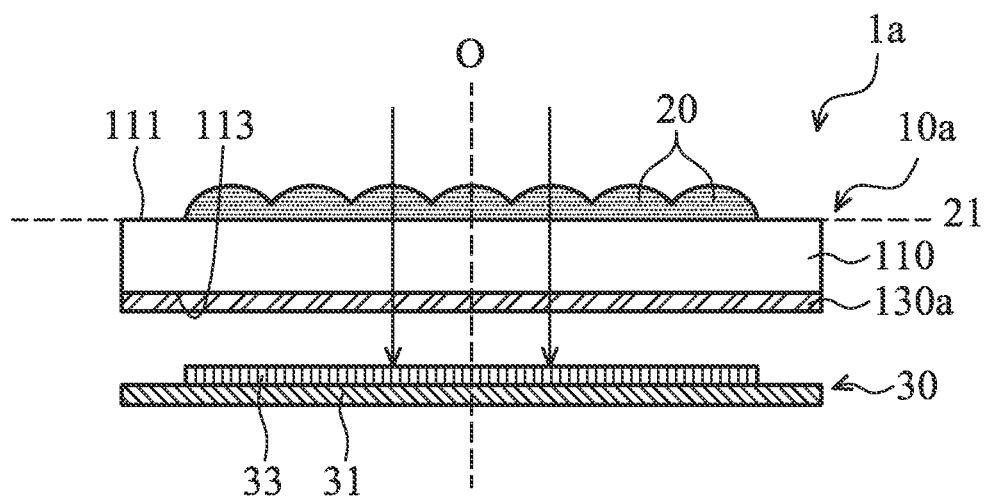
FIG. 3 shows an exploded view of an image-capturing assembly, in accordance with some embodiments.

Referring to FIG. 3 an exploded view of an image-capturing assembly 1a is provided, in accordance with some embodiments. Differences between the image-capturing assembly 1a and the image-capturing assembly 1 include the substrate assembly 10 being replaced by a substrate assembly 10a.

In some embodiments, the substrate assembly 10a includes the main body 110 and a supporting layer 130a. The supporting layer 130a is formed on the rear surface 113 of the main body 110 by coating. The supporting layer 130a has a planar configuration and extends in a direction that is parallel to the predetermined plane 21 along which the lens units 20 are arranged. In some embodiments, the supporting layer 130a entirely covers the rear surface 113 of the main body 110.

The supporting layer 130a is made of a material different from the material of the main body 110. For example, the supporting layer 130a is made of polymer composites, and the main body 110 is made of glass. In some embodiments, the supporting layer 130 is transparent. The refractive index of the supporting layer 130a is similar to the refractive index of the main body 110 so that the optical performance is kept even the supporting layer 130a is formed on the main body 110. The thickness of the supporting layer 130a is in a range from about 0.3 micrometer to about 200 micrometer. The ratio of the thickness of the main body 110 to the thickness of the supporting layer 130a is in a range from about 0.03% to about 20%.

In some embodiments, since the stress applied to the main body 110 is absorbed by the supporting layer 130a, warpage to the main body 110 is prevented, and the light passing through the array of lens units 20 and the substrate assembly 10a is directed to the optical sensor unit 30 according to optical design of the image-capturing assembly 1a as shown in FIG. 3. Therefore, the image quality of the image-capturing assembly 1a is ensured.

It is appreciated that while the supporting layer 130a is formed on the rear surface 113 of the main body 110, it should not be limited thereto. In some embodiments not illustrated, the supporting layer 130a is formed on the front surface 111 of the main body 110, and the lens units 20 are formed on the supporting layer 130a. In some other embodiments, a number of supporting layers 130a are respectively formed on both the front surface 111 and the rear surface 113. The configuration of the supporting layer 130a should not be limited to the aforementioned embodiments. Different configurations of the supporting layer 130a are described in connection with FIGS. 4-12.

Figure 4:
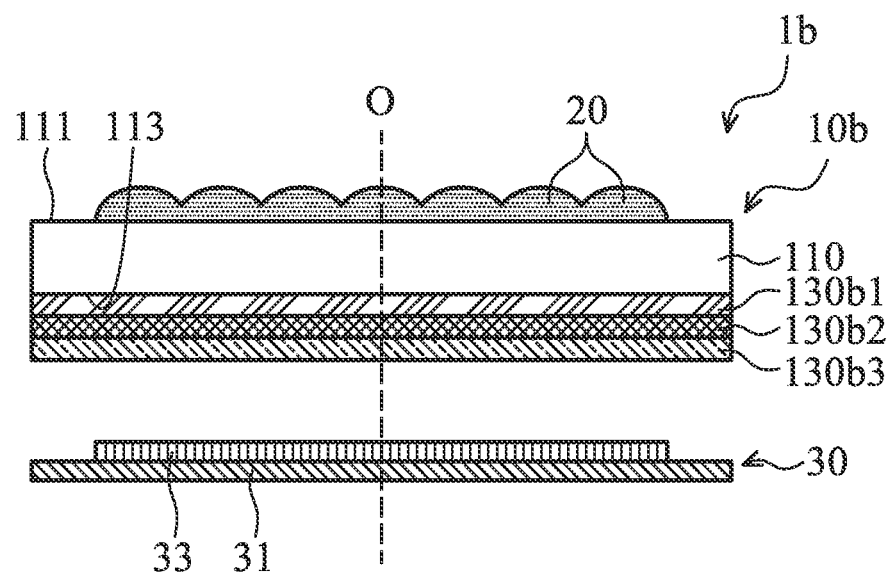
FIG. 4 shows an exploded view of an image-capturing assembly, in accordance with some embodiments.

Referring to FIG. 4 an exploded view of an image-capturing assembly 1b is provided, in accordance with some embodiments. Differences between the image-capturing assembly 1b and the image-capturing assembly 1 include the substrate assembly 10 being replaced by a substrate assembly 10b.

The substrate assembly 10b includes the main body 110 and a number of supporting layers (such as the supporting layers 130b1, 130b2, and 130b3). The supporting layers 130b1, 130b2, and 130b3 are stacked on the main body 110. A stiffness of one of the supporting layers 130b1, 130b2, and 130b3 is different from a stiffness of another adjacent supporting layer. For example, the supporting layers 130b1 and 130b3 have the same stiffness, and the supporting layer 130b2 has a stiffness that is different from the stiffness of the supporting layers 130b1 and 130b3. With such arrangements, the mechanical strength of the substrate assembly 10b is further increased, and the image quality of the image-capturing assembly 1b is improved.

Figure 5:
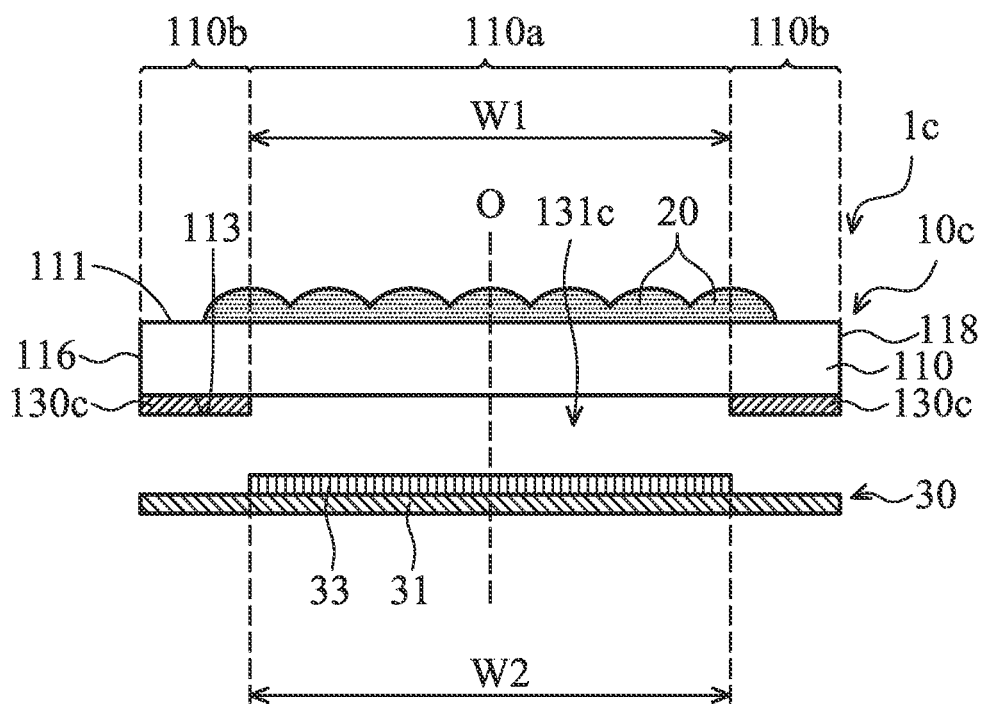
FIG. 5 shows an exploded view of an image-capturing assembly, in accordance with some embodiments.
Figure 6:
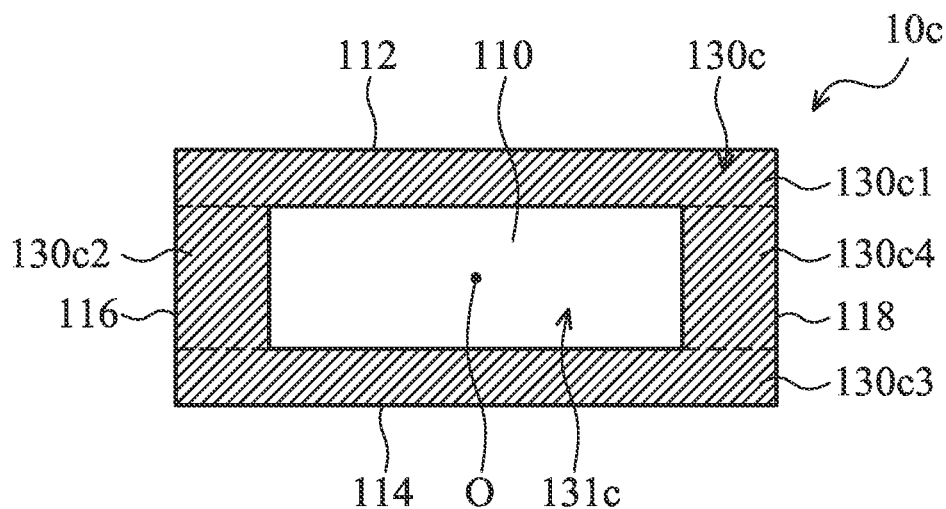
FIG. 6 shows a bottom view of a substrate assembly, in accordance with some embodiments.

Referring to FIGS. 5 and 6, an exploded view of an image-capturing assembly 1c is shown in FIG. 5, and a bottom view of a substrate assembly 10c is shown in FIG. 6, in accordance with some embodiments. As shown in FIG. 5, differences between the image-capturing assembly 1c and the image-capturing assembly 1 include the substrate assembly 10 being replaced by a substrate assembly 10c.

The substrate assembly 10c includes the main body 110 and a supporting layer 130c. For the purpose of description, as shown in FIG. 5, a central segment 110a and a peripheral segment 110b of the main body 110 are defined. The central segment 110a is relative to the optical axis O, and the peripheral segment 110b is located between the central segment and the lateral surface of the main body 110 (such as the lateral surfaces 116 and 118). In some embodiments, the ratio of the area of the rear surface 113 corresponding to the central segment 110a to the area of the entire rear surface 113 is in a range from about 50% to about 100%, depending on CMOS Image Sensor Active area.

The supporting layer 130c is formed on the rear surface 113 corresponding to the peripheral segment 110b of the main body 110. The rear surface 113 of the main body 110 corresponding to the central segment 110a is not covered by the supporting layer 130c. Namely, an opening 131 corresponding to a center of the main body 110 (i.e., relative to the optical axis O) is formed on the supporting layer 130c. In other words, as shown in FIG. 6, the supporting layer 130c includes a number of supporting portions, such as the supporting portions 130c1, 130c2, 130c3, and 130c4. The supporting portions 130c1, 130c2, 130c3, and 130c4 are arranged peripherally around the optical axis O. Each of the supporting portions 130c1, 130c2, 130c3, and 130c4 is connected to one of the lateral surfaces 112, 114, 116, and 118 of the main body 110.

Figure 7:
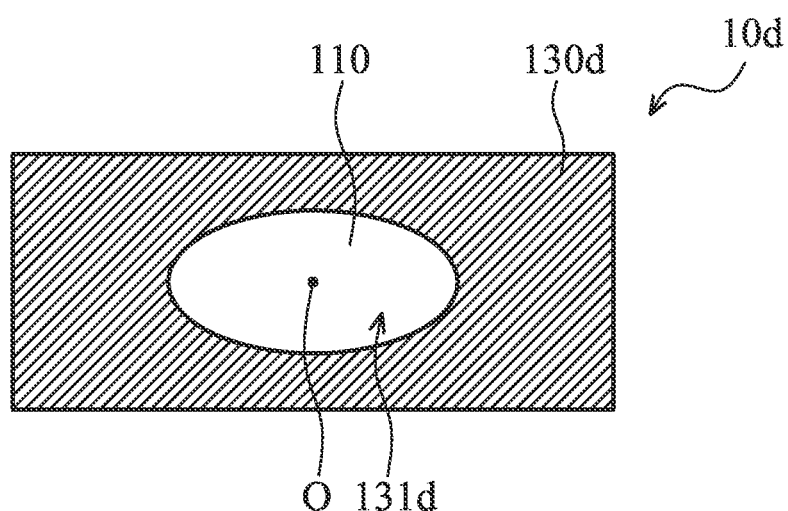
FIG. 7 shows a bottom view of a substrate assembly, in accordance with some embodiments.

In some embodiments, the opening 131c has a shape corresponding to a shape of the image-capture element 33. For example, the image-capture element 33 and the opening 131c respectively have a rectangular shape. Therefore, most of the light received by the image-capture element 33 does not pass through the supporting layer 130c, and the image quality is not affected by the supporting layer 130c. However, the shape of the opening 131c should not be limited to the embodiments. For example, as shown in FIG. 7, an opening 131d formed on the supporting layer 130d is in an elliptical shape.

Figure 8:
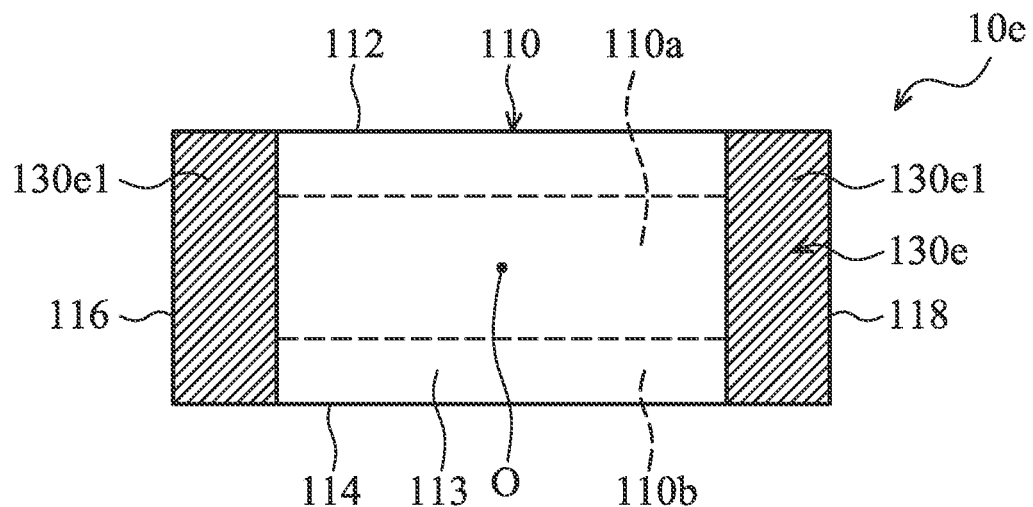
FIG. 8 shows a bottom view of a substrate assembly, in accordance with some embodiments.

Referring to FIG. 8 a bottom view of a substrate assembly 10e is provided, in accordance with some embodiments. Differences between the substrate assembly 10e and the substrate assembly 10c include the supporting layer 130c being replaced by a supporting layer 130e.

The supporting layer 130e includes a first supporting portion 130e1 and a second supporting portion 130e2. The first and second supporting portions 130e1 and 130e2 are formed on the rear surface 113 corresponding to the peripheral segment 110b of the main body 110. Specifically, the first and second supporting portions 130e1 and 130e2 are located at two opposite sides of the optical axis O and respectively connected to the lateral surfaces 116 and 118 (i.e., the two short sides of the main body 110). The stiffness of the first and second supporting portions 130e1 and 130e2 may be the same or different. In some embodiments, the first and second supporting portions 130e1 and 130e2 have different stiffness.

Figure 9:
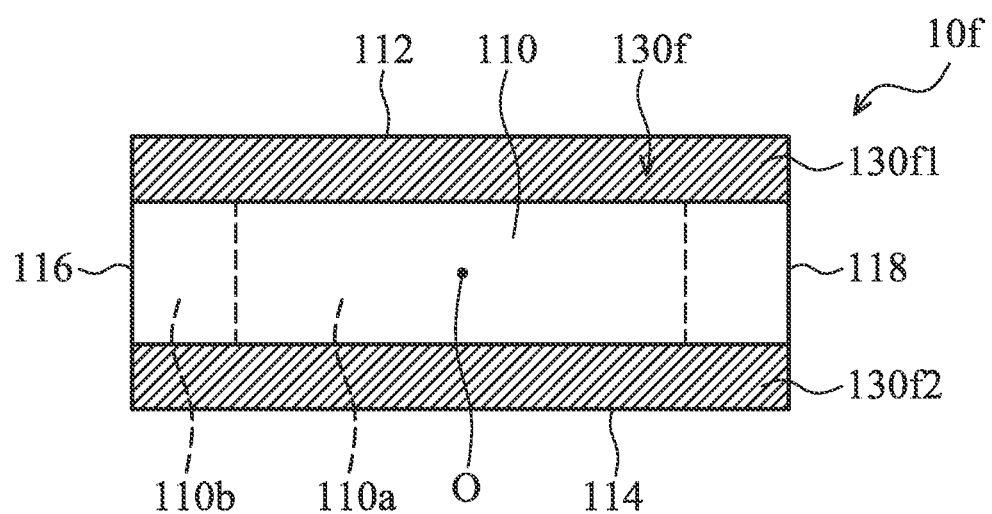
FIG. 9 shows a bottom view of a substrate assembly, in accordance with some embodiments.

Referring to FIG. 9 a bottom view of a substrate assembly 10f is provided, in accordance with some embodiments. Differences between the substrate assembly 10f and the substrate assembly 10c include the supporting layer 130c being replaced by a supporting layer 130f.

The supporting layer 130f includes a first supporting portion 130f1 and a second supporting portion 130f2. The first and second supporting portions 130f1 and 130f2 are formed on the rear surface 113 corresponding to the peripheral segment 110b of the main body 110. Specifically, the first and second supporting portions 130f1 and 130f2 are located at two opposite sides of the optical axis O and respectively connected to the lateral surfaces 112 and 114 (i.e., the two long sides of the main body 110). The stiffness of the first and second supporting portions 130f1 and 130f2 may be the same or different. In some embodiments, the first and second supporting portions 130f1 and 130f2 have different stiffness.

Figure 10:
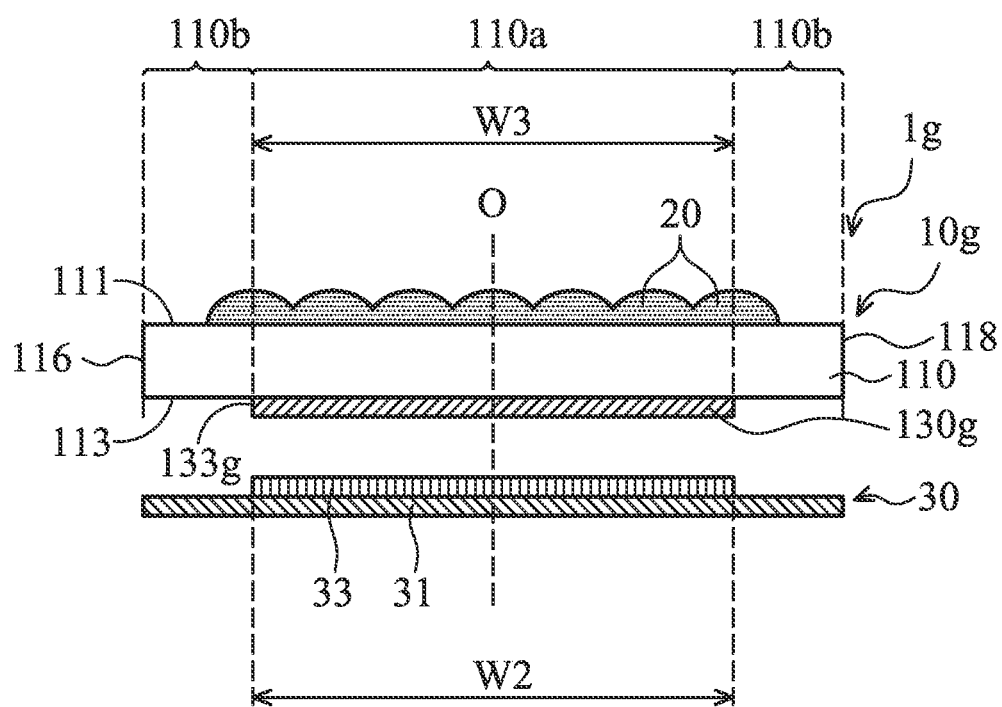
FIG. 10 shows an exploded view of an image-capturing assembly, in accordance with some embodiments.
Figure 11:
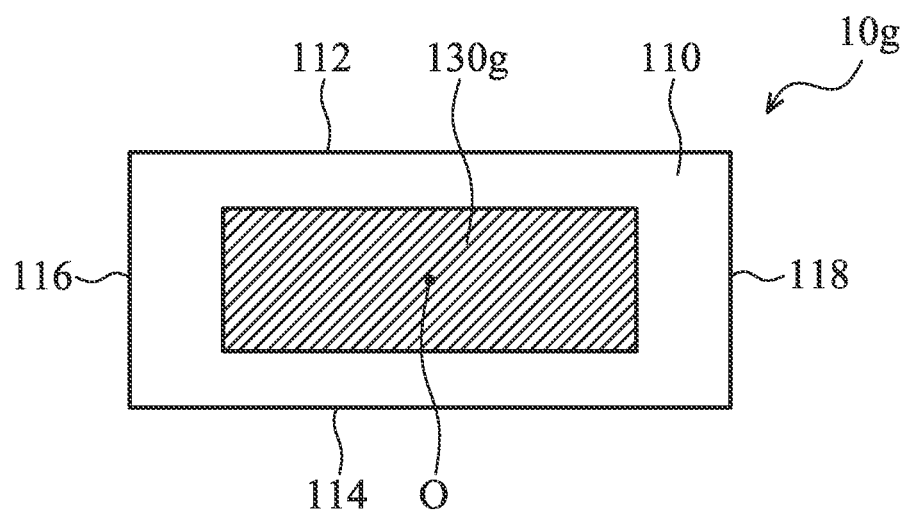
FIG. 11 shows a bottom view of a substrate assembly, in accordance with some embodiments.

Referring to FIGS. 10 and 11 an exploded view of an image-capturing assembly 1g is shown in FIG. 10, and a bottom view of a substrate assembly 10g is shown in FIG. 11, in accordance with some embodiments. As shown in FIG. 10, differences between the image-capturing assembly 1g and the image-capturing assembly 1 include the substrate assembly 10 being replaced by a substrate assembly 10g.

The substrate assembly 10b includes the main body 110 and a supporting layer 130g. The supporting layer 130g is formed on the rear surface 113 of the main body 110 corresponding to the central segment 110a. The rear surface 113 of the main body 110 corresponding to the peripheral segment 110b is not covered by the supporting layer 130g. Namely, the edge 133g of the supporting layer 130g is distant from the lateral surface (such as the lateral surfaces 116 and 118) of the main body 110. In some embodiments, the width W3 of the supporting layer 130g is smaller than or equal to the width W2 of the image-capture element 33.

Figure 12:
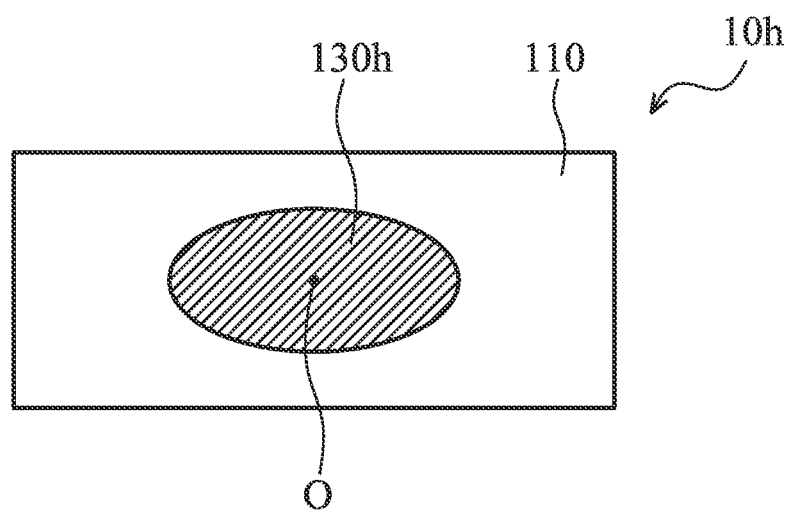
FIG. 12 shows a bottom view of a substrate assembly, in accordance with some embodiments.

In some embodiments, the supporting layer 130g has a shape corresponding to a shape of the image-capture element 33. For example, as shown in FIG. 11, the supporting layer 130g has rectangular shape corresponding to the shape of the image-capture element 33 (FIG. 10). However, the shape of the supporting layer 130g should not be limited to the embodiments. For example, as shown in FIG. 12, a supporting layer 130g formed on the main body 110 of a substrate assembly 10h is in an elliptical shape.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens module, comprising:
a substrate assembly comprising:
a main body having a front surface and an opposing rear surface, the rear surface being on the image side of the lens module; and
a supporting layer with a planar configuration formed on the main body to prevent the main body from deforming, wherein the main body is made of a first material and the supporting layer is made of a second material different from the first material, wherein the refractive index of the supporting layer is the same as the refractive index of the main body, and the ratio of the area of the supporting layer to the area of the entire rear surface is in a range about 50% to about 100%; and an array of lens units formed on the substrate assembly.

2. The lens module as claimed in claim 1, wherein the array of lens units are arranged on a predetermined plane, and the supporting layer extends in an extension direction parallel to the predetermined plane.

3. The lens module as claimed in claim 1, wherein the main body has a front surface, a rear surface opposite to the front surface, and at least one lateral surface connecting the front surface to the rear surface, wherein the supporting layer is formed on at least one of the front surface and the rear surface.

4. The lens module as claimed in claim 3, wherein an edge of the supporting layer is distant from the lateral surface.

5. The lens module as claimed in claim 3, wherein the number of lateral surfaces is more than one, and the supporting layer comprises a plurality of supporting portions respectively connected to one of the lateral surfaces.

6. The lens module as claimed in claim 5, wherein one of the supporting portions has a stiffness that is different from the stiffness of another.

7. The lens module as claimed in claim 1, wherein the number of supporting layers is more than one, and the supporting layers are stacked on the main body, wherein a stiffness of one of the supporting layers is different from a stiffness of another adjacent supporting layer.

8. The lens module as claimed in claim 1, wherein an opening corresponding to a center of the main body is formed on the supporting layer.

9. The lens module as claimed in claim 1, wherein the first material comprises glass.

10. The lens module as claimed in claim 1, wherein the second material comprises polymer composites.

11. A lens module having an optical axis passing therethrough, comprising:
a substrate assembly comprising:
a main body having a central segment relative to the optical axis and a peripheral segment located between the central segment and a lateral surface of the main body, wherein the main body has a front surface and an opposing rear surface, the rear surface being on the image side of the lens module; and
a supporting layer with a planar configuration formed on the main body to prevent the main body from deforming, wherein the supporting layer are formed corresponding to the central segment, the peripheral segment, or both the central segment and the peripheral segment,
wherein the main body comprises a first material and the supporting layer comprises a second material different from the first material,
wherein the refractive index of the supporting layer is the same as the refractive index of the main body, and the ratio of the area of the supporting layer to the area of the entire rear surface is in a range about 50% to about 100%; and an array of lens units formed on the substrate assembly.

12. The lens module as claimed in claim 11, wherein the array of lens units are arranged on a predetermined plane, and the supporting layer extends in an extension direction parallel to the predetermined plane.

13. The lens module as claimed in claim 11, wherein the supporting layer comprises a plurality of supporting portions formed on the peripheral segment and arranged around the optical axis.

14. The lens module as claimed in claim 13, wherein one of the supporting portions has a stiffness that is different from the stiffness of another.

15. The lens module as claimed in claim 11, wherein the supporting layer comprises a first supporting portion and a second supporting portion formed on the peripheral segment and located at two opposite sides of the optical axis.

16. The lens module as claimed in claim 11, wherein the number of supporting layers is more than one, and the supporting layers are stacked on the main body, wherein a stiffness of one of the supporting layers is different from a stiffness of another adjacent supporting layer.

17. The lens module as claimed in claim 11, wherein the first material comprises glass.

18. The lens module as claimed in claim 11, wherein the second material comprises polymer composites.

19. An image-capturing assembly, comprising:
an array of lens units;
an image-capture element configured to receive light passing through the array of lens units; and
a substrate assembly arranged between the array of lens units and the image-capture element and comprising:
a main body having a front surface and an opposing rear surface, the rear surface being on the image side of the lens module; and
a supporting layer with a planar configuration formed on the main body to prevent the main body from deforming, wherein the main body is made of a first material and the supporting layer is made of a second material different from the first material, wherein the refractive index of the supporting layer is the same as the refractive index of the main body, and the ratio of the area of the supporting layer to the area of the entire rear surface is in a range about 50% to about 100%.

20. The image-capturing assembly as claimed in claim 19, wherein an opening is formed on the supporting layer, and the opening has a shape corresponding to a shape of the image-capture element.

* * * * *